Feb. 14, 1967   W. B. GILES   3,303,810
ADDITIVE DRAG REDUCTION WITH RECIRCULATION
Filed April 29, 1965

Inventor:
Walter B. Giles,
by Paul A. Frank
His Attorney.

United States Patent Office 3,303,81[0]
Patented Feb. 14, 196[7]

3,303,810
ADDITIVE DRAG REDUCTION WITH
RECIRCULATION
Walter B. Giles, Scotia, N.Y., assignor to General Electric
Company, a corporation of New York
Filed Apr. 29, 1965, Ser. No. 451,763
5 Claims. (Cl. 114—67)

My invention relates to the reduction of drag on water vehicles, and more particular, to a method and apparatus for recirculating drag reducing additives in the proximity of ships to reduce frictional drag caused by water.

With the rapid advances in marine technology, the need arises for ways to reduce the frictional drag of water on the surfaces of ships and other water vehicles. The use of small concentrations of many natural and synthetic, high polymer substances for reducing frictional drag in a liquid has been well established. These additives, mainly water soluble viscoelastic polymers, are injected into the water proximate the surface on which it is desired to reduce the skin friction drag of turbulent flow. The disadvantage with this method is that the additives were either dumped or otherwise ejected in the vicinity of the surface without any control over the distribution, or any prolongation or reuse of the drag reducing powers of the additives. In other words, the method was simply a single attempt to achieve the desired drag reduction without any chance for correction of any error in the placing of the additives in the water. The efficiency of this method was at times very great but also because of the uncertainty of the placement of the additives, its efficiency could be quite minute. An interrelated problem was that there was no way of reusing the additives once they were placed in water, since they would be quickly dissipated in the ship's wake without any way of recapturing them. A way is then needed for reducing frictional drag on ships and other water vehicles whereby the drag reducing additive is added to the water proximate the vehicle in a manner so that a substantial portion is recaptured and recirculated for maximum efficiency thereof. My invention envisions an ejection system on a ship which places additives of water soluble drag reducing viscoelastic polymers in the water directed so that they flow along the sides of the vehicle and are readily caught by suitable receiving means on the vessel located downstream of the ejection means for reuse of the additive.

The principal object of my invention is the provision of a way for recirculating and thereby reusing a substantial portion of an additive which is employed for reducing frictional drag on water vehicles.

Another object of my invention is the provision of such a device wherein the apparatus for projecting and/or entrapping the additive is automatically adjusted for maximum efficiency thereof.

These and other objects of my invention will be more readily apparent from the description which follows.

In carrying out the objects of my invention, I provide a method and apparatus for injecting an additive of the group comprising a viscoelastic, water soluble polymer into the flow stream adjacent the sides of a water vehicle to reduce the frictional effect of drag thereon. A catching or entrapping device is located toward the rear of the vehicle and is positionable by means of an angular detection sensor so that it readily adjusts to catch a substantial portion of the additive, which is then recirculated to obtain maximum efficiency therefrom.

The attached drawing illustrates a preferred embodiment of my invention in which.

Figure 1:
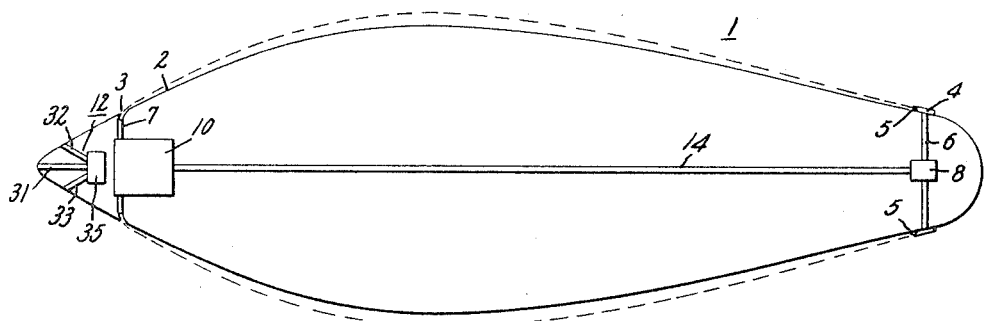
FIGURE 1 is a cross-sectional plan view of a water vehicle employing my invention taken along line 1—1 of FIGURE 2.
Figure 2:
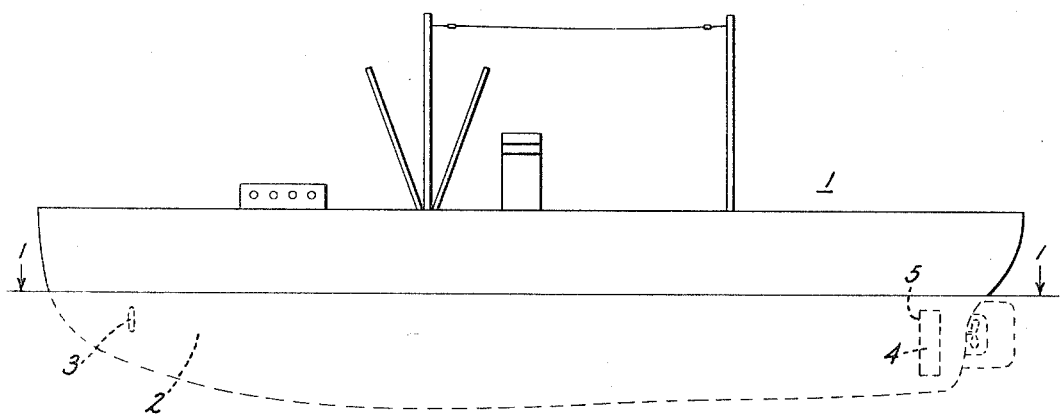
FIGURE 2 is a side view of the vehicle of FIGURE 1.

FIGURE 1 discloses a water vehicle, e.g., a ship, h[av]ing the additive injection apparatus and the recirculati[on] device of my invention. The construction includes a s[hip] or other vehicle 1 which has a tubular ejection means which is flush with surface 2 of ship 1 and is position[ed] proximate the bow or forward end thereof. Ejectors are angled in a manner so that they distribute the ad[di]tive eminating therefrom in a smooth, even manner o[ver] surfaces 2 of ship 1. Supply tank 10 or other stora[ge] means is interconnected by tubes or similar devices 7 [to] projectors 3 for supplying them with the additive to [be] distributed. Located towards the stern of the vessel f[ur]ther downstream from projectors 3 in the direction [of] flow are receiving device 4 or other entrapping mea[ns] having a generally cowl shape for catching the additi[ve] that has been ejected by projectors 3. Receivers 4 a[re] interconnected by tubes or other conveying means 6 [to] a pump 8 within the vessel which in turn is joined [to] a tubular means 14 to recirculate the additive to sup[ply] container 10. Basically then, the additive is stored [in] container 10 from where it is supplied to ejectors 3 whi[ch] eject it along sides 2 of vessel 1. A substantial porti[on] of the additive is then caught by receiving means 4 su[p]plied through tube 6 to pump 8 which recirculates through tube 14 back to container 10 to be reused. R[e]ceiving means 4, which are aforementioned, is locat[ed] towards the rear of vessel 1 may also be placed a su[b]stantial distance away from the vessel if desired. A su[it]able boom may be provided to hold the receiving mea[ns] at this distance from the vessel. Also, a plurality [of] receiving means may be placed along each side of t[he] ship depending on the variables inherent in the wat[er] through which the vessel is travelling and the length [of] the vessel. In other words, the invention is not limit[ed] to only one receiver on each side; as many receivers are needed to properly catch a substantial portion of t[he] additive and recirculate it for a maximum efficiency a[re] employed. Angle of attack sensor 12 is also employed [at] the bow end of the ship adjacent projector 3 and stora[ge] means 10 and is interconnected to receiving means 4 [so] that receivers 4 are automatically adjusted to recover maximum amount of the additive that is projected. [An] angle of attack sensor is a simple tubular flow arran[ge]ment, as shown in FIGURE 1, comprising three inta[ke] channels at the bow of the ship, one of which 31 is c[o]axial with the long axis of the ship and the other t[wo] 32 and 35 are at angles thereto. When the ship tur[ns] more water is received in one side channel 32 or 33 th[an] the other so that analyzer 35 can then indicate the pa[th] of the ship. Sensor 12 is connected by a mechanical [or] hydraulic linkage to receiving means 4 to move the [re]ceiving means closer or further from the vessel or [to] orient the direction of the forward opening 5 so that maximum amount of additive is received. Also, angle [of] attack sensor 12 may control ejecting means 3 so that maximum amount of the additive is caught by receiver[s] for recirculation by the system. Also, ejectors 3 and [re]ceivers 4 may be interconnected to the angle of atta[ck] sensor 12 so that optimum performance of the combin[a]tion is obtained. With the recirculation system, the d[is]advantages inherent in simply dumping additive over t[he] side of the ship with no possibility of recovering any [of] this additive are now obviated since a substantial porti[on] of the additive is recaught and recirculated through t[he] system to be reused. A single pump 8 and storage co[n]tainer 10 are illustrated, but it will be appreciated th[at] a separate one may be provided for each side of the shi[p] if desired.

The additives which are used for drag reduction p[ur]poses are well known in the art. They are basical[ly] viscoelastic water soluble polymers which have certa[in] interrelated properties, which are basically linearity, hi[gh]

ity, water solubility, high molecular weight, and ogen bond forming capability. The former of these, rity, indicates that they are long chain molecules ig an essentially unbranched structure. Thus, they very high length to diameter ratios and thereby form long chains which substantially reduce turbulence and by reduce drag. High polarity is interrelated to the rity to aid in reducing frictional drag. Water solu- is important from the aspetc of having the molecules ly disperse in the water for proper drag reduction. gh molecular weight seems to be inherent in the lin- y and long molecular structure which is most effec- for drag reduction. Some of the effective additives lrag reduction are: Guar Gum Locust Bean Gum, geenan or Irish moss, Gum Karaya, hydroxyethyl lose, carboxymethyl-cellulose, polyethylene oxide, icrylimide, polyvinylpyrrolidone. It will be appre- d that the above-mentioned additives are representa- of the many additives for drag reduction that exist i meet the prerequisites of the viscoelastic water le polymers aforementioned.

operation, as the vehicle travels through the water, ive which is stored in container 10 is supplied by a or other supply means through a suitable tube to ion means 3 which distributes it outward along sides vessel 1. The additive is preferably mixed with r in container 10 either by adding water before use iring use. Angle of attack sensor 12 is interconnected ojectors 3 to properly orient them so that the addi- are properly distributed along surfaces 2 to aid in ing a laminar boundary layer along the sides of l 2. The maintenance of a laminar boundary layer Is turbulence and assures substantially drag free op- on. After the additives which are in solution are cted into the flow stream, they flow substantially ; surfaces 2 of ship 1 or reasonably proximate thereto e received by receivers 4. As aforementioned, re- rs 4 are positioned also by means of sensor 12, by ; interconnected thereto by suitable hydromechanical echanical linkages, so that they are properly adjusted mbination with projectors 3 for receiving a substan- imount of the additive that has been ejected by pro- rs 3. This additive is then received through cowl ing 5 in receivers 4. Also as aforementioned, there be a plurality of receivers, if desired. Also, re- rs 4 can be adjustable in any desired manner such / increasing their front opening 5, their position ver- y with respect to the vehicle, or even their orientation respect to the flow stream. In any case, these ad- ients will probably be made by attack sensor 12, so a maximum amount of additive is recovered. The ive then flows from receivers 4 through a suitable or transmitting structure 6 into pump 8 which re- lates the additive through tube 14 and back into stor- ontainer 10 for reuse. In FIGURE 1 a single pump own for both sides of the ship but it is noted that a ate one for each side may be provided. Thereby a antial amount of the additive is reused with very waste thereof. Also, by the employment of an ad- ble projector, laminar flow along the boundary layer ie vehicle is assured and by the use of an angle of k sensor in combination with receivers 4 and ejec- 3 optimum use is made of the additive that is em- d and reuse through the recirculation system to by effectively use a minimum of additive for maxi- effectiveness. Angle of attack sensor 12 is most il during turning maneuvers since this takes into con- ation the direction of the ship so that projectors 3 receiving means 4 are properly oriented so that a antial portion of the additive is recovered. The ive may be reused numerous times with very slight ase in effectiveness thereof. It is noted that by hav- laminar boundary layer, the distribution of additives tter over the entire surface than with a turbulent dary layer. With a turbulent boundary layer, dilu- tion occurs due to turbulent mixing, and consequently, much higher additive injection rates would be required. Thus, for most effective transmission of the additive to reduce drag on the vehicle, the advantages of a laminar boundary layer are readily appreciated. The laminar boundary layer effectively damps and stabilizes transi- tional sublayers to aid in more effective drag reduction. A more effective even flow area is thereby achieved for more effective drag reduction. The long molecular chains of the additives are better adapted to laminar flow because of the smooth nature of laminar flow whereas with turbu- lent flow, they become disrupted and break down due to the high stresses associated therewith and are not as effec- tive in reducing drag.

Reirculation with laminar flow then overcomes a pres- ent practical limitation of adding additives for drag re- duction. It will be appreciated that the need of a high solubility rate with recirculation is no longer required, since many passes of the additive are made, giving it sufficient time to achieve proper solubility.

Underwater as well as surface vehicles can make ef- fective use of my drag reduction techniques. With sur- face vehicles, the drag reduction would take place along the underwater surface areas and with underwater ve- hicles along all surface areas. Even vehicles such as hydrofoils and others, where only a slight area is in the water, can make effective use of drag reduction in the underwater surface areas for thereby increasing efficiency and/or speed as desired.

It is also noted that with a laminar boundary layer and the use of properly applied additives, surface roughness which substantially adds to drag is now overcome to a large extent by the combination of this laminar boundary layer and the drag reducing additive.

It will be apparent from the foregoing that my inven- tion attains the objectives set forth. Apparatus embody- ing the invention is sturdy in construction and well adapted for use in conjunction with undersea environments. Be- cause of the recirculation the efficiency of additive drag reduction is substantially increased in a highly efficient manner.

A specific embodiment of my invention has been illus- trated but the invention is not limited thereto since many modifications may be made by one skilled in the art and the appended claims are intended to cover all such modi- fications as fall within the true spirit and scope of my invention.

What I claim as new and desire to secure by Letters Patent of the United States is:

1. A method for reducing frictional drag on water ve- hicles comprising the steps of adding a water soluble viscoelastic polymer, which has a high molecular weight, is highly polar and is linear, to form a laminar flow stream of additive and water in proximity with the surface of a water vehicle in the general direction of the flow stream for reducing drag thereon, entrapping a substantial portion of the additive after it has flowed over the surface of the vehicle, and recirculating the entrapped additive again in the gen- eral direction of the flow stream over the same surface of the vehicle to continue to reduce drag thereon.

2. A method of reducing the frictional drag on water vehicles comprising the steps of sensing the angle-of-at- tack of the vehicle, injecting a drag reducing water soluble viscoelastic polymer having the characteristics of being highly polar and linear along the underwater surface of a water vehicle to reduce drag thereon, entrapping a substantial portion of the additive after it is passed over the underwater surface of said vehicle, adjusting the entrapping means in accord- ance with the angle-of-attack, and recirculating the additive that has been entrapped through the vehicle to reinject the additive over the same surface of the vehicle as before to further reduce drag thereon.

3. A method for reducing frictional drag on ships comprising the steps of sensing the angle-of-attack of the ship,
adding a viscoelastic water soluble polymer, being linear and having a high molecular weight, into proximity with the underwater surface of a ship so that a laminar sublayer of flow is maintained along the underwater surface of the ship with the additive therein for reducing frictional drag on the outer surface of the ship,
catching a substantial portion of the additive after it is passed over the surface of the ship, adjusting the catching means in accordance with the angle-of-attack, and
repassing the caught additive over the same surface of the ship to further reduce the drag thereon and further use a substantial amount of the originally used additive for reducing drag on the surface of the ship.

4. An apparatus for reducing drag on water vehicles comprising
means for injecting a viscoelastic drag reducing shear thinning additive into proximity with a surface of a water vehicle in the general direction of the flow stream for maintaining a laminar flow of a mixture of additive and water along the vehicle for reducing drag thereon,
receiving means for catching a substantial portion of the additive after it is passed over the surface of said vehicle, and
recirculating means within said vehicle for returning the caught additive back to the injection means for reusing that additive for further drag reduction by injecting it in the general direction of the flow stream.

5. An apparatus for reducing drag on ships comprising
an angle of attack sensing means located on a ship for indicating movements of a water vehicle,
means for ejecting a drag reducing additive into proximity with an underwater surface of the ship for reducing frictional drag thereon,
a receiver located proximate the stern of the ship which is controlled by said angle of attack sensor so that it entraps a substantial portion of the additive after it has passed over the surface of the ship, and
a pump for recirculating the additive back through the ship for reuse thereof.

References Cited by the Examiner
UNITED STATES PATENTS

| | | | |
|---|---|---|---|
| 3,016,865 | 1/1962 | Eichenberger | 114—6 |
| 3,075,489 | 1/1963 | Eichenberger | 114—6 |
| 3,196,823 | 7/1965 | Thurston | 114—6 |
| 3,230,919 | 1/1966 | Crawford | 114—6 |

MILTON BUCHLER, *Primary Examiner.*

ANDREW H. FARRELL, *Examiner.*